United States Patent [19]

Kitagawa

[11] Patent Number: 4,964,013
[45] Date of Patent: Oct. 16, 1990

[54] ELECTRIC NOISE ABSORBER

[75] Inventor: Hiroji Kitagawa, Nagoya, Japan

[73] Assignee: Kitagawa Industries Co., Ltd., Aichi, Japan

[21] Appl. No.: 404,622

[22] Filed: Sep. 8, 1989

[30] Foreign Application Priority Data

Sep. 28, 1988 [JP]  Japan .................. 63-126850[U]

[51] Int. Cl.⁵ .................................................. H01F 17/06
[52] U.S. Cl. ............................ 361/113; 333/81 A; 333/81 R; 207/89; 207/91; 207/105; 336/212; 336/DIG. 2
[58] Field of Search ............ 361/113, 111; 333/12, 333/81 R, 81 A; 307/104, 105, 89, 91; 336/212, DIG. 2

[56] References Cited

U.S. PATENT DOCUMENTS

| 3,882,427 | 5/1975 | Pflanz | 331/81 R X |
| 4,716,389 | 12/1927 | Gawronski et al. | 331/81 A |
| 4,719,433 | 1/1988 | Hack et al. | 333/12 |
| 4,818,957 | 4/1989 | Cort | 333/12 |
| 4,825,185 | 4/1989 | Matsui | 336/212 X |

FOREIGN PATENT DOCUMENTS 0157179 2/1985 European Pat. Off. .
2201554 2/1988 United Kingdom .

OTHER PUBLICATIONS

Japanese Patent Application No. 63-39997 Dated Mar. 15, 1988.

Primary Examiner—Derek S. Jennings
Attorney, Agent, or Firm—Oliff & Berridge

[57] ABSTRACT

An electric noise absorber, comprising divided magnetic substances made of ferrite, a holding member made of elastic material and fixtures for being connected to each other or fixed to a component of an electronic device, and engaging grooves formed on the outer surfaces of the magnetic substances for engaging with the holding member, is attached to and detached from an electric cable easily without removing the electric cable, and is composed of a minimum number of units.

22 Claims, 6 Drawing Sheets

ELECTRIC NOISE ABSORBER

BACKGROUND OF THE INVENTION

This invention relates to an electric noise absorber for absorbing electric noise that is generated within an electronic device or that enters the device from the outside through an electric cable.

As a method for absorbing electric noise, it is well-known that surrounding an electric cable with a magnetic substance, such as ferrite, reduces electric noise on the electric cable. For example, in Japan published unexamined utility model application No. 63-39997, two pieces of half ring-shaped ferrite are accommodated in a case, through which an electric cable passes. In another conventional electric noise absorber, two pieces of half ring-shaped ferrite are fixed to an electric cable with adhesive tape. In the related-art devices, the electric noise absorbers can be attached to and detached from electric cables without removing installed cables because the ferrite is divided in two, and these absorbers can be moved to the most effective position to reduce electric noise. However, these related-art electric noise absorbers are large and their installation operations are very tedious.

Fixing ferrite to an electric cable with adhesive tape is inconvenient because installation operations are complicated and the adhesive tape must be removed from and attached to cables again whenever the position of the fixed ferrite needs to be changed.

When two pieces of ferrite are accommodated in a case, an electric cable can be easily fixed between the two pieces of ferrite. However, because the case must contain the ferrite pieces and have elastic units for securing the surfaces of the two ferrite pieces together, the case must be large and its shape complicated.

SUMMARY OF THE INVENTION

It is an object of this invention to provide a small electric noise absorber which can be easily attached to and detached from electric cable.

This object is realized by an electric noise absorber of the invention which includes: two magnetic substances divided in the longitudinal direction which are shaped so as to surround the periphery of electric cable and absorb electric noise on an electric cable of an electronic device, a holding member made of elastic material with fixtures at both ends of the elastic material, the fixtures connectable to each other or fixable to a component of an electronic device, and engaging grooves formed on the outer surfaces of the magnetic substances for engaging with the holding member.

This electric noise absorber with a structure mentioned above can surround an electric cable securely and be attached to a component of an electronic device so as not to pull down the electric cable and move it from its desired position. Furthermore, the present electric noise absorber absorbs electric noise on the electric cable effectively; it has low impedance to electric noise of 1 MHz and 20 MHz when contact planes of two magnetic substances are open, but impedance to electric noise of 1 MHz or 20 MHz increases to a designated numerical value when the contact planes are closed. Briefly, this electric noise absorber can absorbs electric noise under 20 MHz.

BRIEF DESCRIPTION OF THE DRAWINGS

This invention is illustrated diagrammatically in the following drawings wherein.

DETAILED DESCRIPTION OF PREFERRED EMBODIMENTS

Set forth is an explanation of embodiments of the present invention with reference to the attached drawings FIG. 1 through FIG. 12.

Figure 1:
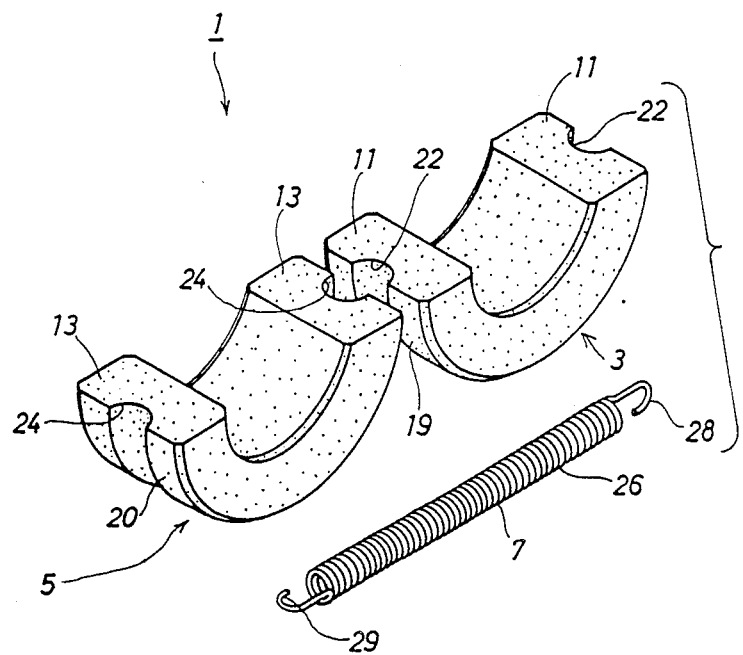
FIG. 1 is a perspective view of an electric noise absorber of the first embodiment.

As shown in FIG. 1, a perspective view of the first embodiment, an electric noise absorber 1 comprises a first magnetic substance 3, a second magnetic substance 5, both of which are made of ferrite and surround an electric cable of an electronic device, and a holding member 7 which holds the two magnetic substances 3 and 5.

Figure 2:
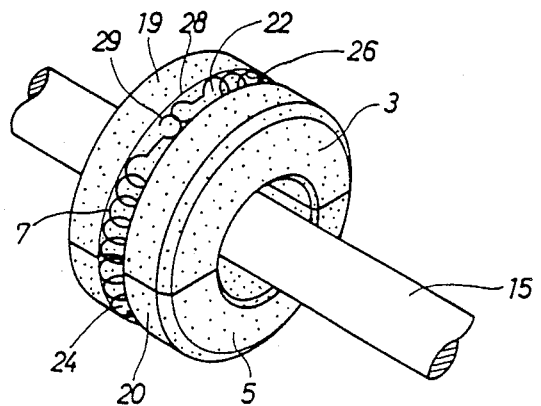
FIG. 2 is a perspective view of the electric noise absorber in use of the first embodiment.
Figure 3:
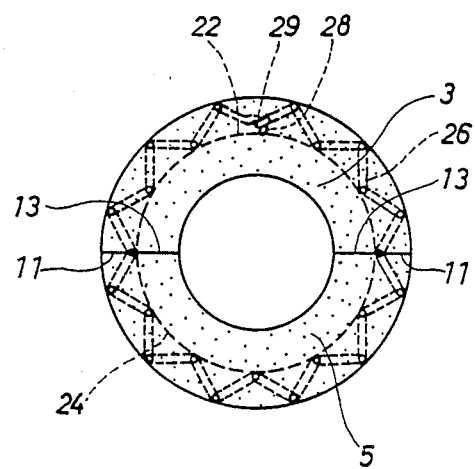
FIG. 3 is a front view of the electric noise absorber of the first embodiment.

The first magnetic substance 3 and the second magnetic substance 5, whose perspective view is shown in FIG. 1, perspective view in use in FIG. 2, and front view in FIG. 3, are shaped so as to surround an electric cable 15 of an electronic device when contact planes 11 of the first magnetic substance 3 and contact planes 13 of the second magnetic substance 5 are closed. Thus, a strong magnetic circuit of ferrite is formed around the electric cable. After it is sintered, a magnetic substance can be divided with a diamond cutter into two magnetic substances 3 and 5. Their respective contact planes 11 and 13 are then polished. Alternatively, the magnetic substances 3 and 5 can be molded together in a press die with a V-shaped groove, sintered, and broken into two pieces, instead of using a diamond cutter.

Two magnetic substances 3 and 5 have engaging grooves 22 and 24 respectively on their outer surfaces 19 and 20. These engaging grooves 22 and 24, whose cross sections are semicircle, engage with holding member 7. Holding member 7 is composed of a coiled spring 26 and hooks 28 and 29 on both ends of the coiled spring 26. Holding member 7 has enough length and strength to surround the two magnetic substances 3 and 5 and press them when the hooks 28 and 29 are connected.

The first magnetic substance 3 and the second magnetic substance 5 surround the electric cable 15 as follows.

First, the electric noise absorber 1 shown in FIG. 1 is put around the electric cable 15 and the contact planes 11 and 13 are closed. Then holding member 7 is fitted in the engaging grooves 22 and 24 of the magnetic substances 3 and 5 with the coiled spring 26 extended, and the hooks 28 and 29 are connected as shown in FIG. 2. Consequently, a magnetic circuit of ferrite is formed around the electric cable 15.

Regarding the magnetic substance, either hard or soft ferrite can be used. Further, plastic magnet or synthetic rubber magnet or the like, which is made by mixing magnetic ferrite powder with plastic or rubber or the like, can also be used.

Figure 4:
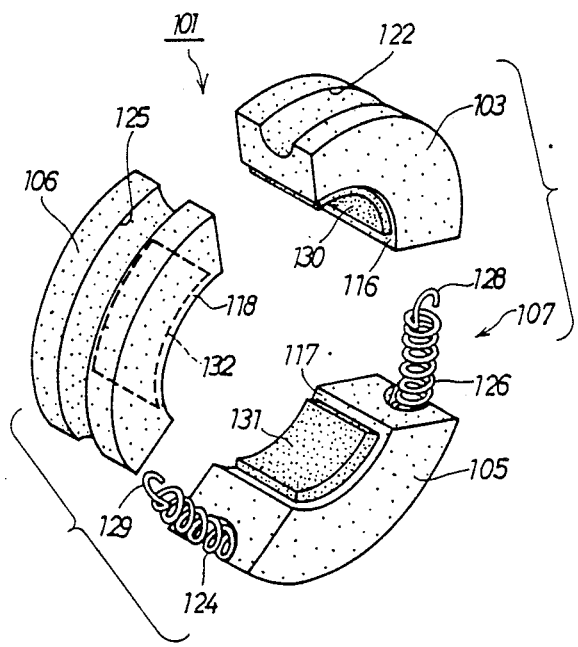
FIG. 4 is a perspective view of the second embodiment.
Figure 5:
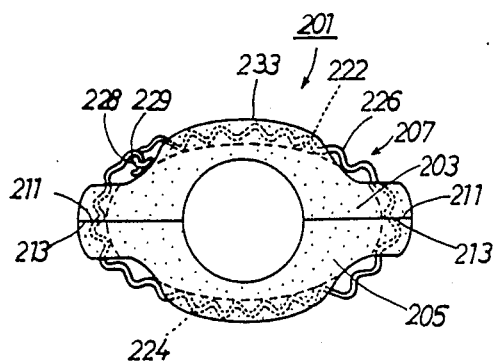
FIG. 5 is a front view of the third embodiment.

In the second embodiment shown in FIG. 4, a magnetic substance can be divided into three parts; a first magnetic substance 103, a second magnetic substance 105, and a third magnetic substance 106. Electric noise absorber 101 comprises magnetic substances 103, 105, and 106 having engaging grooves 122, 124, and 125, respectively, and a holding member 107 with a coiled spring 126 and hooks 128 and 129. The engaging grooves 122, 124, and 125 are formed on the outer surfaces of the magnetic substances 103, 105, and 10 respectively. The coiled spring 126 is extended and fitted in the engaging grooves 122, 124, and 125, and then the hooks 128 and 129 are connected. Thus the holding member 107 engages with the three magnetic substances 103, 105, and 106. Sheets of foam urethane 130, 131, and 132 are attached to respective inner surfaces 116, 117, and 118 of the magnetic substances 103, 105, and 106. These sheets of urethane keep the electric cable at a desired position.

The following is the third embodiment. An electric noise absorber 201 shown in FIG. 5, a front view, is a variation of the electric noise absorber 1 in FIGS. 1 and 3. A first magnetic substance 203 and a second magnetic substance 205 are elongated horizontally so that the areas of contact planes 211 and 213 are larger than the cross sectional areas of other places 233. A holding member 207 with a coiled spring 226 and hooks 228, and 229 engages with engaging grooves 222 and 224 on the outer surfaces of the magnetic substances 203 and 205.

Figure 6:
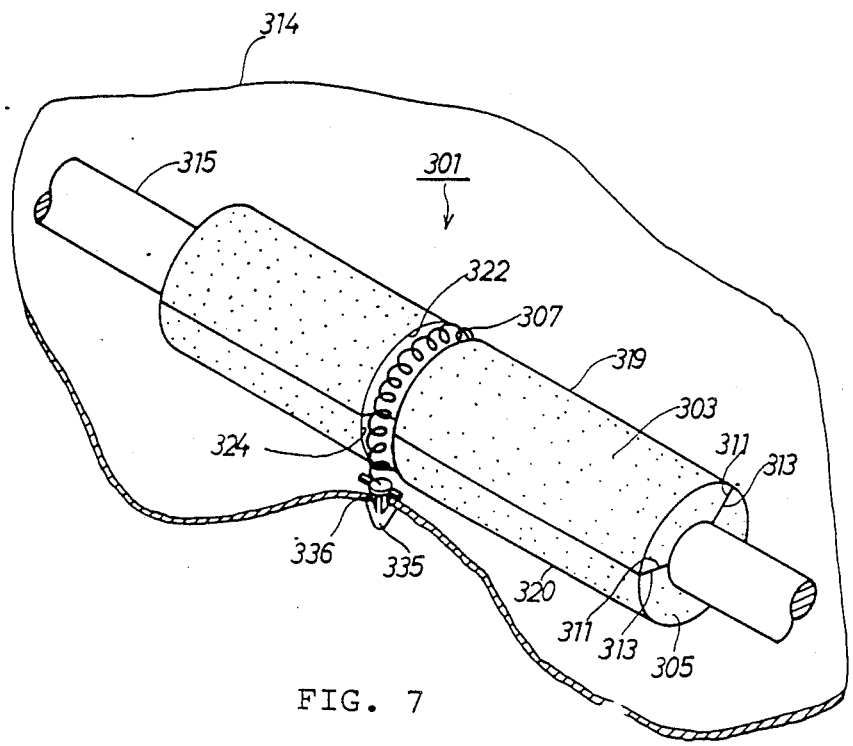
FIG. 6 is a perspective view of the fourth embodiment.
Figure 7:
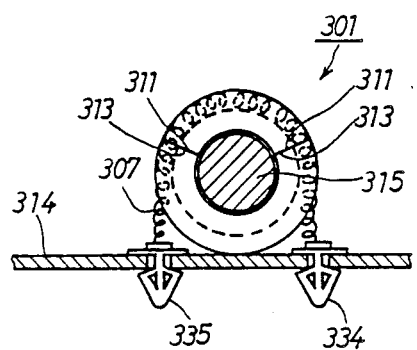
FIG. 7 is a front view of the fourth embodiment.

An electric noise absorber 301 of the fourth embodiment is shown in FIG. 6, a perspective view, and in FIG. 7, a front view. A second magnetic substance 305 is larger than a first magnetic substance 303. Holding member 307 has two anchor-like fixtures 334 and 335, one at each end. On the respective outer surfaces 319 and 320 of the magnetic substances 303 and 305, engaging members 322 and 324 are formed, with which the holding member 307 engages. The fixtures 334 and 335 of the holding member 307 are inserted and fixed in holes 336 of a component 314 of an electronic device, as shown in FIG. 7. Thus the electric noise absorber 301 surrounding an electric cable 315 can be attached to the component 314 such that the two contact planes 311 and 313 are closed.

Figure 8:
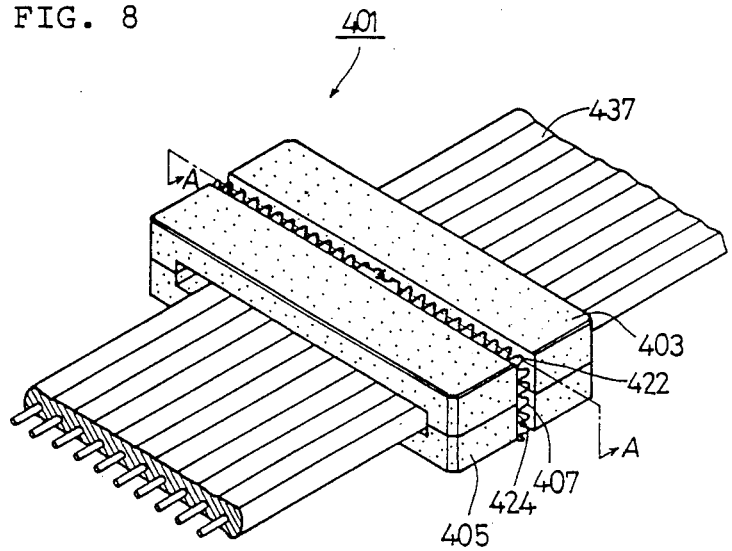
FIG. 8 is a perspective view of the fifth embodiment.
Figure 9:
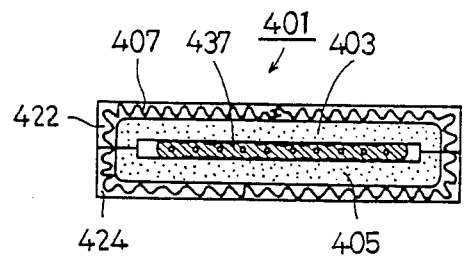
FIG. 9 is a cross-sectional view taken on line A—A in FIG. 8.

In FIGS. 8 and 9 an electric noise absorber 401 of the fifth embodiment is illustrated. This electric noise absorber 401 for absorbing electric noise from a flat cable 437 comprises a first magnetic substance 403 and a second magnetic substance 405, which surround the flat cable 437, and a holding member 407 similar to the holding member 7 in the first embodiment. The magnetic substances 403 and 405 have engaging grooves 422 and 424 on the outer surfaces, and the holding member 407 presses the magnetic substances 403 and 405 at the engaging grooves 422 and 424.

Figure 10:
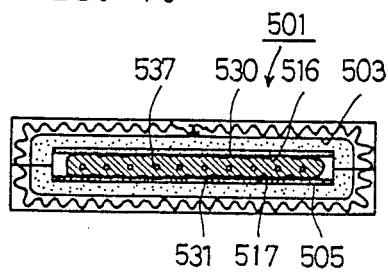
FIG. 10 is a cross-sectional view of the sixth on line A—A in FIG. 8.

In the sixth embodiment shown in FIG. 10, an electric noise absorber 501 is similar to the electric noise absorber 401 in FIGS. 8 and 9. Sheets of foam urethane 530 and 531 are attached to the inner surfaces 516 and 517 of a first magnetic substance 503 and a second magnetic substance 505 so as to keep a flat cable 537 in position.

Figure 11:
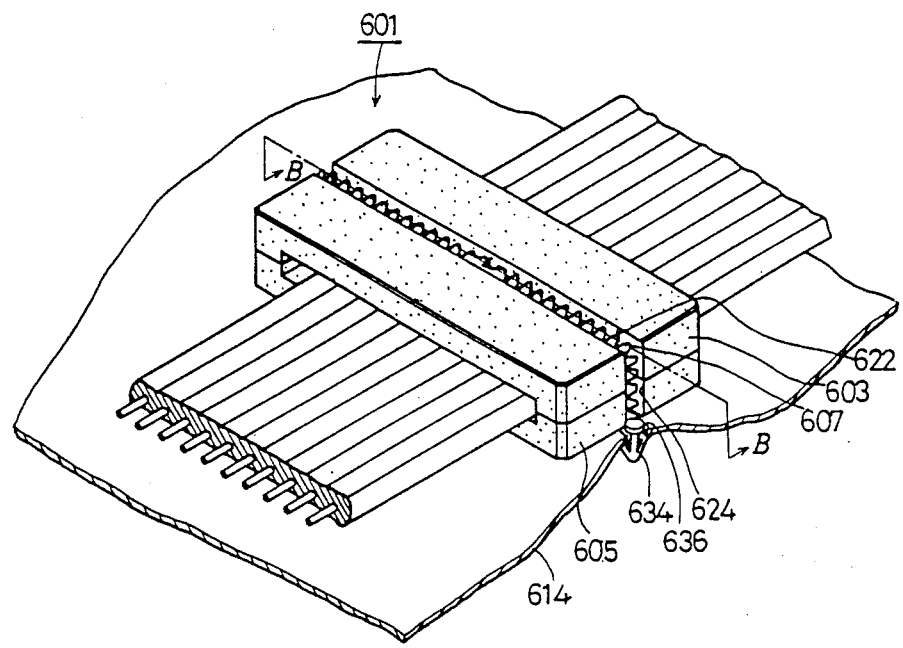
FIG. 11 is a perspective view of the seventh embodiment.
Figure 12:
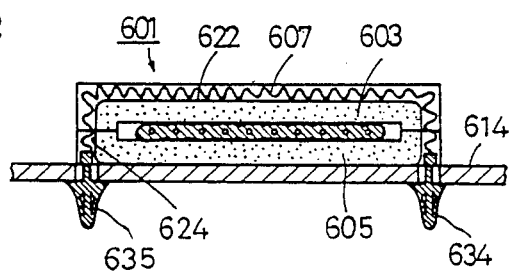
FIG. 12 is a cross-sectional view taken on line B—B in FIG. 11.

An electric noise absorber 601 of the seventh embodiment in FIGS. 11 and 12 can be attached to a component 614 of an electronic device. A holding member 607 has fixtures 634 and 635 at both ends, which are inserted and fixed in holes 636 of the component 614. The holding member 607 engages with engaging grooves 622 and 624 of a first magnetic substance 603 and second magnetic substance 605. Consequently, the electric noise absorber is fixed to component 614.

It should be understood that this invention is not limited to the embodiments illustrated and described, but that in its broadest aspects it includes all equivalent embodiments and modifications that come within the scope of the claims.

What is claimed is:

1. An electric noise absorber for absorbing noise on an electric cord comprising:
   a plurality of bodies of magnetic substance, each having an engaging indentation on its outer surface, which bodies contact each other such that they surround the cord;
   an elastic holding member having two ends, with fasteners attached to each end, where the holding member engages the engaging indentations on the bodies such that the bodies are securely held together when the fasteners are fastened; and
   the engaging indentations have surfaces for preventing the holding member from moving in either direction along the longitudinal axis of the cord.

2. The electric noise absorber of claim 1, wherein the bodies of magnetic substance are formed by longitudinally dividing a tubular body of magnetic substance.

3. The electric noise absorber of claim 1, wherein the engaging indentations are grooves.

4. The electric noise absorber of claim 1, wherein the elastic holding member comprises a coiled spring.

5. The electric noise absorber of claim 1, wherein the fastening means are hooks.

6. The electric noise absorber of claim 1, wherein the bodies are held together by engaging the fasteners to one another.

7. The electric noise absorber of claim 1, wherein the bodies are held together and the noise absorber is secured to a surface by attaching the fasteners to the surface.

8. The electric noise absorber of claim 1, wherein positioning means for contacting the cable and keeping the cable in a desired position are attached to the inner surfaces of the bodies.

9. The electric noise absorber of claim 8, wherein the positioning means are sheets of a foam material.

10. The electric noise absorber of claim 2, wherein the tube of magnetic substance is elongate and a larger body and a smaller body are formed, with the larger body being placed adjacent to a surface and the fasteners being fastened to two points on the surface such that the bodies of magnetic substance are held together and the noise absorber is held against the surface.

11. An electric noise absorber for absorbing noise on an electric cord comprising:
   two bodies of magnetic substance with contacting inner surfaces, at least one inner surface having an inner groove formed thereon for accommodating the cord such that the cord is surrounded by the bodies, each body having an engaging groove on its outer surface;

an elastic holding member having two ends with fasteners attached to each end, where the holding member engages the engaging grooves on the bodies such that the bodies are securely held together when the fasteners are fastened; and the engaging indentations have surfaces for preventing the holding member from moving in either direction along the longitudinal axis of the cord.

12. The electric noise absorber of claim 11, wherein the bodies are flat.

13. The electric noise absorber of claim 12, wherein positioning means are placed in the inner grooves for contacting the cord and holding it in a desired position.

14. The electric noise absorber of claim 13, wherein the fasteners are fastened to two points on a surface, thereby holding the noise absorber to the surface.

15. The electric noise absorber of claim 13, wherein the fasteners are attached to each other.

16. An electric noise absorber for absorbing the noise on an electric cord comprising:

a coil spring with hooks on each end; and two bodies of magnetic substance, each having a hemi-cylindrical groove for receiving the cord on its inner surface and an engaging groove for receiving the coil spring on its outer surface and preventing the spring from moving in either direction along the axis of the cord.

17. The electric noise absorber of claim 16, wherein the hooks are fastened to each other.

18. The electric noise absorber of claim 16, wherein the hooks fasten to two points on a surface, thereby holding the two bodies together and fixing the noise absorber to the surface.

19. The electric noise absorber of claim 16, wherein positioning means for holding the cord in a desired position are attached to the hemi-cylindrical groove.

20. An electric noise absorber for absorbing noise on an electric cord comprising:

a plurality of bodies of magnetic substance, each having an engaging indentation on its outer surface, which bodies contact each other such that they surround the cord;

an elastic holding member having two ends, with fasteners attached to each end, where the holding member engages the engaging indentations on the bodies such that the bodies are securely held together when the fasteners are fastened; and positioning means for contacting the cable and keeping the cable in a desired position attached to the inner surfaces of the bodies.

21. The electric noise absorber of claim 20, wherein the positioning means are sheets of foam material.

22. An electric noise absorber for absorbing the noise on an electric cord comprising:

a coil spring with hooks on each end; and two bodies of magnetic substance, each having a hemi-cylindrical groove for receiving the cord on its inner surface and an engaging groove for receiving the coil spring on its outer surface;

wherein the hooks are fastened such that the tension of the spring holds the two bodies together around the cord; and positioning means attached to the hemi-cylindrical groove for holding the cord in a desired position.

* * * * *